United States Patent [19]
Hujishima et al.

[11] Patent Number: 6,086,304
[45] Date of Patent: *Jul. 11, 2000

[54] SET OF FASTENING MEANS CONNECTED BY A CONNECTING MEANS

[75] Inventors: Atuyoshi Hujishima; Ichinari Nakamura, both of Tokyo, Japan

[73] Assignee: Max Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,083

[22] Filed: Sep. 4, 1997

[51] Int. Cl.⁷ ...................................... F16B 15/08
[52] U.S. Cl. .................... 411/443; 411/442; 411/457; 411/920; 206/340; 206/345
[58] Field of Search ..................... 411/442, 443, 411/457, 920; 206/340, 345, 346, 347

[56] References Cited

U.S. PATENT DOCUMENTS

| | | |
|---|---|---|
| 1,026,050 | 5/1912 | Reber ........................................ 411/442 |
| 2,743,445 | 5/1956 | Lerner ....................................... 206/340 |
| 3,358,822 | 12/1967 | O'Connor ................................. 411/442 |
| 3,613,878 | 10/1971 | Langas ..................................... 206/340 |
| 3,647,593 | 3/1972 | Lingle ...................................... 206/340 |
| 4,791,014 | 12/1988 | West ........................................ 206/340 |
| 4,836,372 | 6/1989 | Shelton .................................... 411/442 |
| 5,733,085 | 3/1998 | Shida ....................................... 206/345 |

FOREIGN PATENT DOCUMENTS

| | | | |
|---|---|---|---|
| 1057398 | 3/1954 | France .................................... 206/340 |
| 1116244 | 6/1968 | United Kingdom ................... 411/443 |

*Primary Examiner*—Flemming Saether
*Attorney, Agent, or Firm*—Jacobson, Price, Holman & Stern, LLC

[57] ABSTRACT

A sheet of staples (11) are formed by arranging a plurality of straight staples (1) in a row like a sheet of paper, and a staple set (10) is formed as a result of connecting them to each other by gluing a at least uniaxially oriented film (12) on at least one surface of the sheet of staples (11) so that the longitudinal direction of the straight staple (1) coincides with the orientation of the film (12).

5 Claims, 7 Drawing Sheets

7. PS film – easy direction (film thickness 25 μm)

|  | maximum load [kgf] | maximum load stress [kgf/mm²] | elongated quantity [mm] | elongation percentage [%] |
|---|---|---|---|---|
| minimum value | 1.32 | 7.51 | 1.67 | 3.3 |
| mean value | 1.37 | 7.81 | 1.84 | 3.7 |
| maximum value | 1.45 | 8.29 | 2.17 | 4.3 |

8. PS film – difficult direction (film thickness 25 μm)

|  | maximum load [kgf] | maximum load stress [kgf/mm²] | elongated quantity [mm] | elongation percentage [%] |
|---|---|---|---|---|
| minimum value | 1.53 | 8.74 | 1.80 | 3.6 |
| mean value | 1.54 | 8.82 | 1.94 | 3.9 |
| maximum value | 1.57 | 8.97 | 2.14 | 4.3 |

FIG. 7

0. Biaxial Oriented PET film – longitudinal oriented direction (film thickness 12 μm)

|  | maximum load [kgf] | maximum load stress [kgf/mm²] | elongated quantity [mm] | elongation percentage [%] |
|---|---|---|---|---|
| minimum value | 2.14 | 25.48 | 48.11 | 96.2 |
| mean value | 2.19 | 26.02 | 51.20 | 102.4 |
| maximum value | 2.22 | 26.42 | 53.52 | 107.0 |

0'. Biaxial Oriented PET film – lateral oriented direction (film thickness 12 μm)

|  | maximum load [kgf] | maximum load stress [kgf/mm²] | elongated quantity [mm] | elongation percentage [%] |
|---|---|---|---|---|
| minimum value | 2.14 | 25.48 | 43.51 | 87.0 |
| mean value | 2.22 | 26.37 | 48.59 | 97.2 |
| maximum value | 2.31 | 27.50 | 52.57 | 105.1 |

FIG. 8

1. Easily tearable PET film–easy direction (film thickness 20 μm)

| | maximum load [kgf] | maximum load stress [kgf/mm²] | elongated quantity [mm] | elongation percentage [%] |
|---|---|---|---|---|
| minimum value | 0.85 | 7.12 | 0.90 | 8.2 |
| mean value | 0.93 | 7.76 | 1.09 | 9.9 |
| maximum value | 0.99 | 8.23 | 1.25 | 11.3 |

2. Easily tearable PET film–difficult direction (film thickness 20 μm)

| | maximum load [kgf] | maximum load stress [kgf/mm²] | elongated quantity [mm] | elongation percentage [%] |
|---|---|---|---|---|
| minimum value | 3.35 | 27.88 | 2.21 | 20.1 |
| mean value | 3.50 | 29.17 | 2.71 | 24.6 |
| maximum value | 3.62 | 30.16 | 3.20 | 29.1 |

FIG. 9

3. Easily tearable PET film–easy direction (film thickness 22 μm)

| | maximum load [kgf] | maximum load stress [kgf/mm²] | elongated quantity [mm] | elongation percentage [%] |
|---|---|---|---|---|
| minimum value | 0.54 | 3.63 | 1.10 | 10.0 |
| mean value | 0.58 | 4.46 | 1.51 | 13.7 |
| maximum value | 0.61 | 5.06 | 2.54 | 23.1 |

4. Easily tearable PET film–difficult direction (film thickness 22 μm)

| | maximum load [kgf] | maximum load stress [kgf/mm²] | elongated quantity [mm] | elongation percentage [%] |
|---|---|---|---|---|
| minimum value | 2.82 | 21.70 | 2.79 | 25.3 |
| mean value | 3.17 | 24.64 | 3.60 | 32.7 |
| maximum value | 3.53 | 27.38 | 4.23 | 38.4 |

FIG. 10

| | 5. Easily tearable PET film–easy direction (film thickness 39 μm) | | | | 6. Easily tearable PET film–difficult direction (film thickness 42 μm) | | | |
|---|---|---|---|---|---|---|---|---|
| | maximum load [kgf] | maximum load stress [kgf/mm²] | elongated quantity [mm] | elongation percentage [%] | | maximum load [kgf] | maximum load stress [kgf/mm²] | elongated quantity [mm] | elongation percentage [%] |
| minimum value | 1.22 | 5.23 | 18.88 | 171.6 | minimum value | 5.12 | 19.83 | 4.19 | 38.1 |
| mean value | 1.28 | 5.54 | 20.45 | 185.9 | mean value | 5.54 | 22.11 | 4.79 | 43.5 |
| maximum value | 1.35 | 5.91 | 22.99 | 209.0 | maximum value | 5.96 | 23.45 | 5.34 | 48.5 |

# SET OF FASTENING MEANS CONNECTED BY A CONNECTING MEANS

BACKGROUND OF THE INVENTION

1. Field of the Invention

This invention relates to a set of fastening means, such as a sheet of staples contiguously arranged in a row which are to be loaded in a manual or electric stapler or a clip belt consisting of metallic clips arranged like a belt which are used to fasten layers of, for example, paper together.

2. Description of the Related Art

Nowadays, there is on the market a copying machine provided with an electric stapler so that a fixed number of sheets of paper onto which an original work has been copied are not mingled with another fixed number of copied sheets when all the sheets are placed in layers by means of, for example, a sorter.

Above an edge of the sheets placed in layers, a magazine of the electric stapler is disposed which is loaded with a plurality of sets of staples arranged in rows, and, under the edge of the sheets, a clincher of the electric stapler is disposed which clinches both ends of the staple interrelatedly with the magazine.

The magazine is provided with a pushing plate for separating a staple occupying the front row of the set of staples from the other staples of the set of staples and then pushing out the front staple. With the layers of paper between the magazine and the clincher, the pushing plate is pressed against the set of staples perpendicularly so as to push out the front staple. The front staple which has been pushed out and separated from the other staples of the set of staples by means of the pushing plate is bent into a U-shape, and then both ends of the U-shaped staple are driven into the layers of paper. When both the ends of the staple project from the bottom of the layers of paper, the clincher approaches the pushing plate and clinches the ends thereof so as to fasten the layers of paper together.

Figure 11:
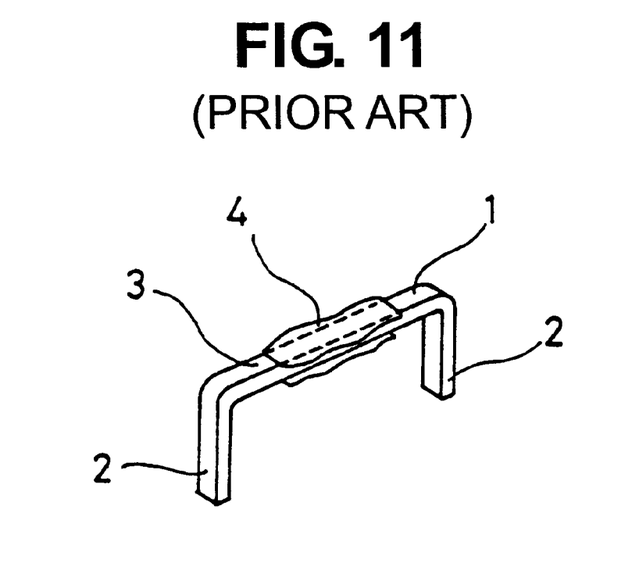
FIG. 11 is a perspective view of a staple formed into a U-shape by the use of a conventional staple set.

Conventionally, a set of staples of this type are formed by sticking a film via an adhesive agent to the staples arranged in a row. A straight staple 1 occupying the front row of the set of staples is driven out and is formed into a U-shape consisting of leg portions 2, 2 and a straight middle portion 3, as shown in FIG. 11. Films 4 stuck to the top and back sides of the middle portion 3 of the staple 1 are so thin as to be cut off with slight force when the staple 1 is driven out.

However, the conventional set of staples have a problem in that a part of the film 4 stretches out from one or both sides of the staple 1 in a thickness direction of the staple 1 when the staple 1 is pushed out and separated from the other staples of the set of staples by means of the pushing plate. This staple 1 is inferior in outward appearance.

Further, the conventional set of staples have a problem in that high driving power or large driving mechanism is required because great force is required to separate a staple from the other staples of the set of staples. Accordingly, in order to enlarge the pushing force of the pushing plate, the weight of the pushing plate must be enlarged, or the input acceleration required when the pushing plate is pushed out must be increased.

SUMMARY OF THE INVENTION

The present invention was made in view of the aforementioned problems. It is an object of the present invention to provide a set of staples one of which is easily separable from the other staples and has no protrusion of a film from the staple in a thickness direction of the staple and therefore is superior in outward appearance.

The present invention is not to be limited to straight staples. The preset invention is also applicable to U-shaped staples bent beforehand, and is also applicable to clips of a clip machine for clasping layers of paper with, for example, metallic pieces. When a clip of a set of clips arranged contiguously is separated from the other clips, a film can be prevented from protruding from both the sides of the separated clip and, in addition, driving electric power or driving force of a mechanism for separating the clips from each other can be reduced.

In order to achieve the object, a set of fastening means according to an aspect of the present invention are formed in such a way that a plurality of platelike or needlelike fastening means for fastening layers of thin material together from a thickness direction of the thin material are arranged in a row and the fastening means are separably connected to each other by gluing a connecting means, such as a film or a membrane, to the fastening means, in which the connecting means has a property of being easily tearable in a direction perpendicular to a direction in which the fastening means are arranged.

Preferably, the fastening means are needlelike staples or platelike clips, and the connecting means is a film having a property of being easily tearable in a uniaxial direction, and a direction in which the film glued to the fastening means is torn is perpendicular to the direction in which the fastening means are arranged.

Preferably, the direction perpendicular to the direction in which the fastening means are arranged is caused to coincide with an orientation which is the weakest with respect to a tensile load against the film.

Preferably, the fastening means are staples, and the film is glued to a middle portion of the set of fastening means excluding at least leg portions thereof.

Preferably, the film is used together with extremely fine fibers extending in the direction in which the fastening means are arranged.

Preferably, the fastening means are needlelike staples or platelike clips, and the connecting means is a film having a property of being easily torn by a tensile load.

According to the present invention, since the connecting means is easily tearable in the direction perpendicular to the direction in which the fastening means are arranged in a row, the fastening means can be easily separated from the other fastening means of the set of fastening means when a pushing plate is pressed against the set of fastening means in the direction perpendicular to the direction in which the fastening means are arranged. As a result, there is no fear that scraps of the connecting means will protrude from both the edges of the separated fastening means. Additionally, since a separating means for separating the connected fastening means does not require excessive separating force or excessive separating acceleration, a problem of enlarging a driving source for driving the separating means or enlarging a separating mechanism can be solved.

Further, according to the present invention, the set of fastening means with the connecting means is applicable to a set of straight or U-shaped staples for use in an electric or manual stapler, or applicable to a set of plate-like clips for use in an electric or manual clip machine. If the electric stapler loaded with the aforementioned staples or electric clip machine loaded with the aforementioned clips is set in a tray or a sorter of a copying machine, or a tray of a FAX machine, the disadvantage that consumption electric power is increased or space requirements are increased can be overcome.

Further, according to the present invention, since the connecting means is easily torn by a tensile load, the connecting means is cut off in a direction in which the plate presses when a fastening means is separated from the other fastening means. Therefore, both side faces of the separated fastening means present good appearance, and thereby the outward appearance of the fastening means is improved. Additionally, since the connecting means is easily tearable, the pushing plate serving as the separating means does not require great force for separating the fastening means.

DETAILED DESCRIPTION OF THE PREFERRED EMBODIMENTS

A set of fastening means connected by a connecting means according to a preferred embodiment of the present invention will be described with reference to the attached drawings. In the following, the same characters are given to the same or equivalent constituent parts as those of the conventional example, respectively, and a detailed description of them is omitted.

Figure 1:
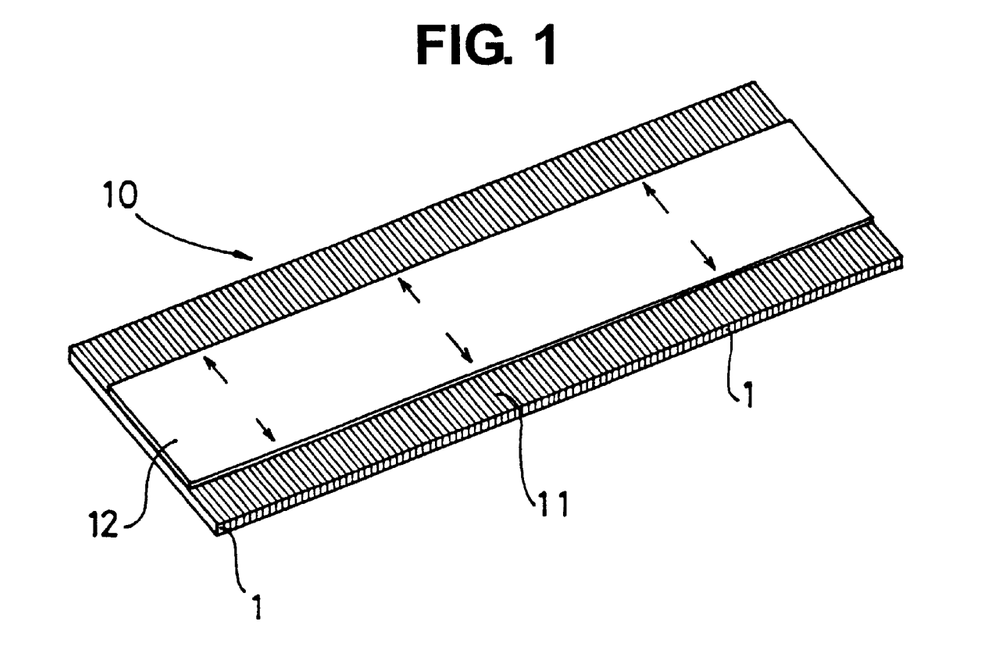
FIG. 1 is a perspective view of a staple set according to an embodiment of the present invention.
Figure 2:
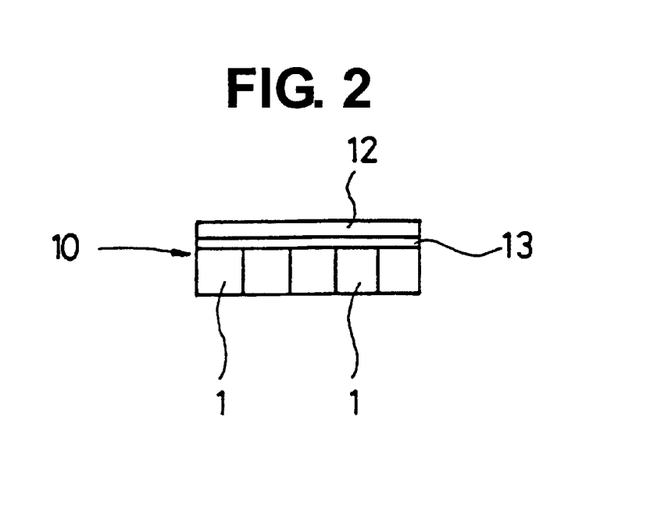
FIG. 2 is a partial side view of the staple set shown in FIG. 1.
Figure 3:
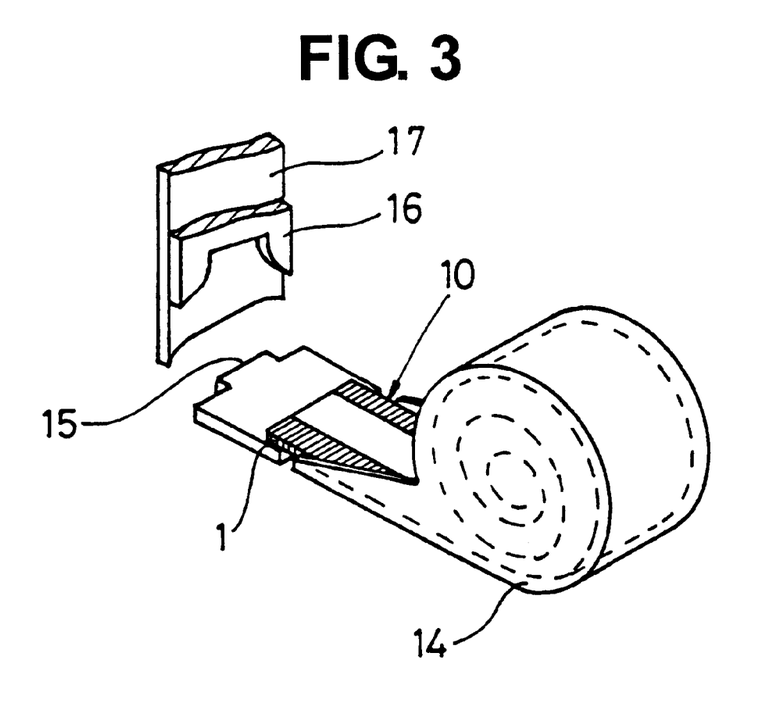
FIG. 3 shows an example in practical use of the staple set shown in FIG. 1.

FIGS. 1 to 3 show an embodiment of the present invention. Reference numeral 10 designates a set of staples as a set of fastening means connected by a connecting means. The staple set 10 is shaped lengthy to feed staples 1 consecutively. The staple 1 is made of surface-treated iron or stainless steel and, before being driven out for use, is a straight wire quadrangular in section. The plurality of straight staples 1 are contiguously arranged in a row and are connected to each other with an adhesive agent. As a result, the contiguously arranged staples are shaped like a sheet of paper. These staples will be referred to as a sheet of staples 11. A very thin film 12 is stuck on at least one surface of the sheet of staples 11. In this embodiment, as can be obviously seen in FIG. 2, the film 12 serving as a connecting means is stuck on one surface thereof with an adhesive agent 13 between the film 12 and the sheet of staples 11. A molten film 12 or a membrane (i.e., extremely thin material) may be applied to the surface of the sheet of staples 11, of course. In a case in which the film 12 is thus stuck on one surface of the sheet of staples 11, the film 12 is designed to be located at the under surface of the middle portion 3 of a U-shaped staple 1 when the staple 1 is driven out.

Therefore, advantageously, the staple 1 is superior in external appearance, and there is no fear that the film 12 will peel off later. The film 12 is caused to adhere to the middle portion 3 of the staple 1 so as not to extend to the leg portions 2 thereof. It is desirable that the film 12 is made as narrow as possible if the sheet of staples to which the narrow film 12 adheres can be maintained without being disconnected when the sheet of staples are rolled or are stored in a rolled state. Additionally, if the film 12 has such great adhesive strength as not to peel off when the leg portions 2 of the staple 1 are driven through layers of, for example, paper, the film 12 may be stuck on not only the middle portion 3 but also the leg portions 2.

The film 12 is made of synthetic resin, such as polyvinyl chloride, polyethylene, polyester, or polystyrene. The film 12 is a uniaxial oriented film which is oriented along at least one axis. The thus oriented film 12 has strong resistance to a tensile load in the axis direction, whereas the film 12 has little resistance to a tensile load in the direction perpendicular to the axis direction. This property is the same as that of, for example, a packing cord of polyethylene film provided with a biased orientation by orienting the film in a single direction. The packing cord is hard to be broken in the longitudinal direction, but is weak and is easily broken in the thickness direction.

Therefore, the film 12 oriented along at least one axis is stuck on the sheet of staples so as to bring about a coincidence between the direction in which the straight staple 1 extends and the orientation of the film 12 (i.e., the directions of arrows in FIG. 1). In this example, the film 12 to be used is oriented along a single axis. Therefore, if a multiaxial oriented film 12 is used, an orientation which does not coincide with the direction of the straight staple 1 may be given in the direction perpendicular to the direction of the straight staple 1, or may be given at an incline of some degrees with respect to the direction of the straight staple 1, or may be given in a state of a combination of the perpendicular direction with the inclined direction. In other words, the orientation of the film 12 may be given in any directions unless the film 12 protrudes from the staple 1 when the staple 1 is driven into the layers of paper. If film material or film thickness facilitating the protrusion of the film 12 is selected for the film 12, it is a countermeasure to particularly weaken the strength of the orientation of the film 12 in the direction of the straight staple 1 in comparison with the strength of the other orientations thereof.

Next, a description will be given of an example in which the film 12 and extremely fine fibers (not shown) are jointly used. Any kinds of materials for the fibers can be used if the fibers have strong resistance to a tensile load in the fibrous direction and, when the fibers are cut off, the cut-off parts of the fibers are inconspicuous (e.g., because the fibers are shrunk after being elongated temporarily), or the fibers are each so thin as to be inconspicuous. When one or several of the fibers arranged with a certain interval therebetween in the longitudinal direction of the sheet of staples 11 are used in combination with the film 12, the sheet of staples 11 on which the film 12 and the fibers are stuck can obtain enough strength to be rolled.

The thus constructed staple set 10 is rolled and mounted in a cartridge 14, as shown in FIG. 3. After the staple set 10 is sent out from the cartridge 14, the staple 1 occupying the front row of the sheet of staples 11 is engaged with a lower-part shaping plate 15, and is bent into a U-shape by means of an upper-part shaping plate 16, and thereafter is separated from the other staples by means of a pushing plate 17 descending from above, and then is driven into, for example, layers of paper (not shown). At this time, since the longitudinal direction of the staple 1 and the orientation of the film 12 are coincident with each other, the staple 1 can be easily driven into the layers with slight force without presenting a poor outward appearance when separated.

Next, a description will be given of a set of fastening means connected by a connecting means according to another embodiment with reference to the attached diagrams and tables. In this embodiment, the fastening means are straight or U-shaped staples or plate-like clips. The connecting means for connecting the fastening means is a film which is frail to a tensile load. The film is polystyrene of a syndiotactic molecular structure.

Figure 4:
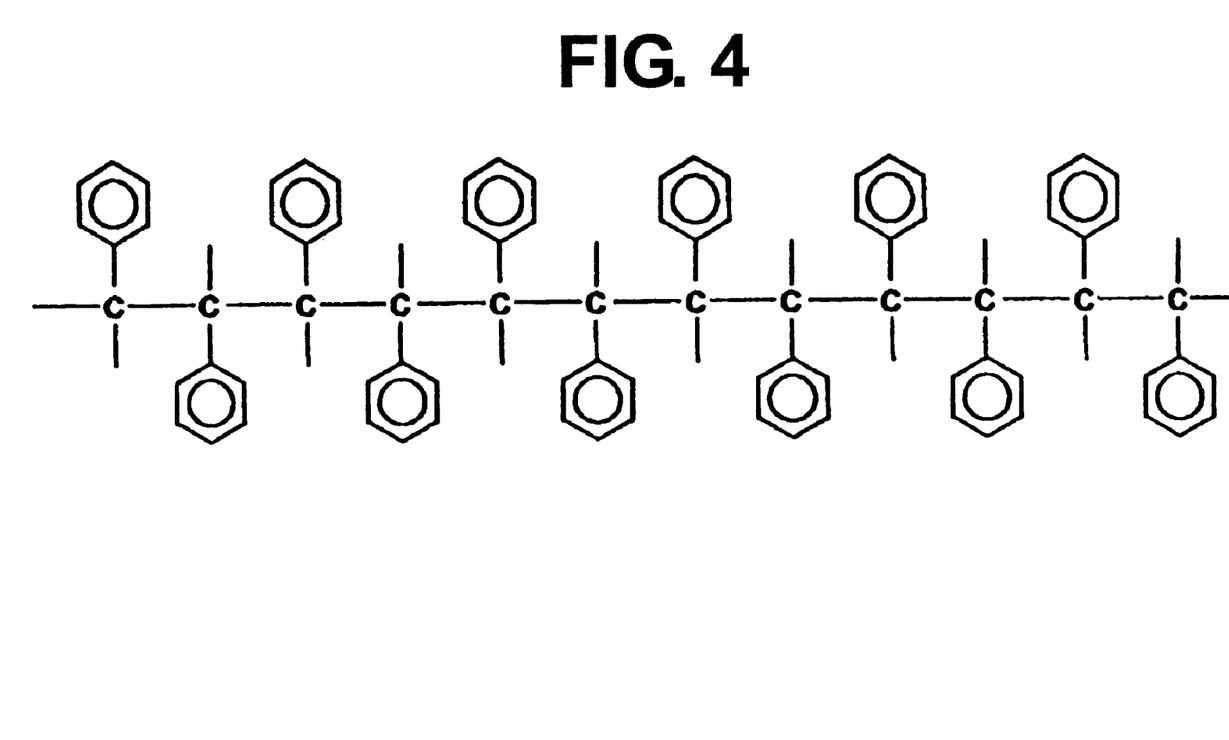
FIG. 4 is a descriptive drawing of the constitutional formula of syndiotactic polystyrene which is used as a connecting means.

FIG. 4 shows the constitutional formula of the syndiotactic polystyrene. The syndiotactic polystyrene (SPS) used in this embodiment is that of IDEMITSU KOSAN Co., Inc. and whose trade mark is "XAREC". However, the present invention is not limited to this. The syndiotactic polystyrene is characterized by quick crystallization, glass transition point (Tg) of 100° C., melting point of (Tm) of 270° C., low hygroscopicity, and high oil resistance. Therefore, the syndiotactic polystyrene is suitable for fastening the layers of paper together.

Figure 5A:
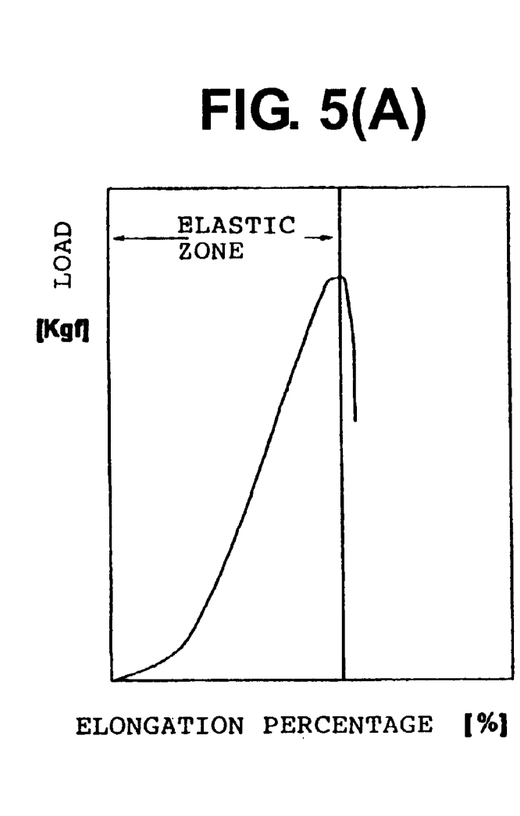
FIG. 5(A) is a graph showing a relationship between an elongation percentage and a tensile load, obtained in an examination as to tearing a syndiotactic polystyrene film.
Figure 5B:
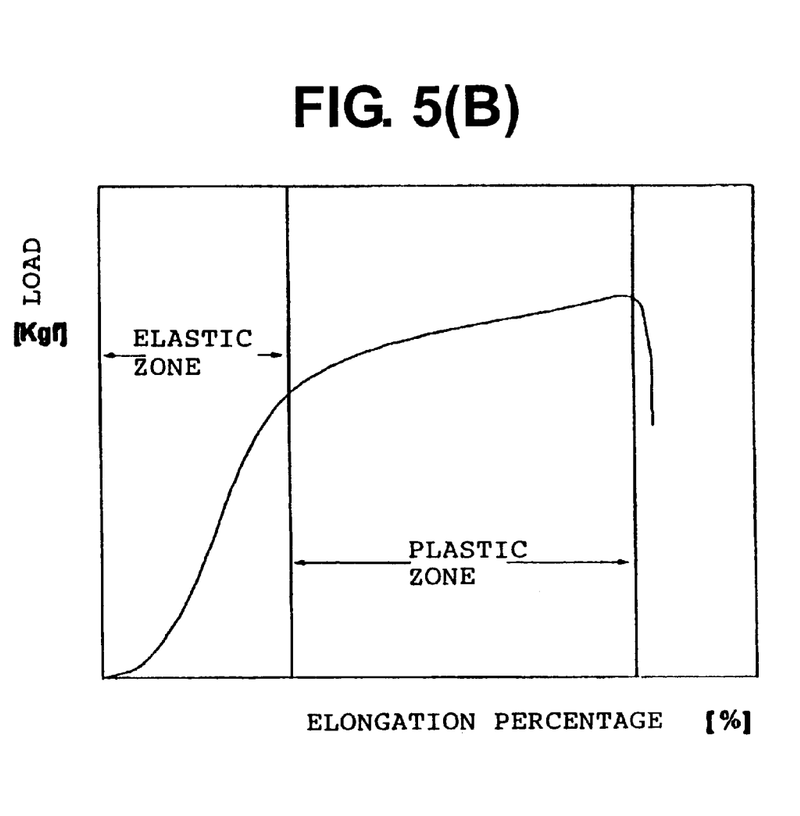
FIG. 5(B) is a graph showing a relationship between an elongation percentage and a tensile load, obtained in an examination as to tearing other plastic films, such as polyethylene, which have been frequently used.

FIG. 5(A) is a graph showing a result of a breaking test of the syndiotactic polystyrene. The abscissa indicates an elongation percentage (%), and the ordinate indicates a tensile load (Kgf). In the case of a normal plastic film, a plastic zone appears next to an elastic zone, as shown in FIG. 5(B). The plastic zone causes the increase of an elongation percentage. In the case of the syndiotactic polystyrene, the tensile load increases in the beginning as the elongation percentage increases, because of the narrowness of the plastic zone. However, when a given elongation percentage is exceeded, the syndiotactic polystyrene undergoes the maximum tensile load and, as a result, is broken.

Figure 6:
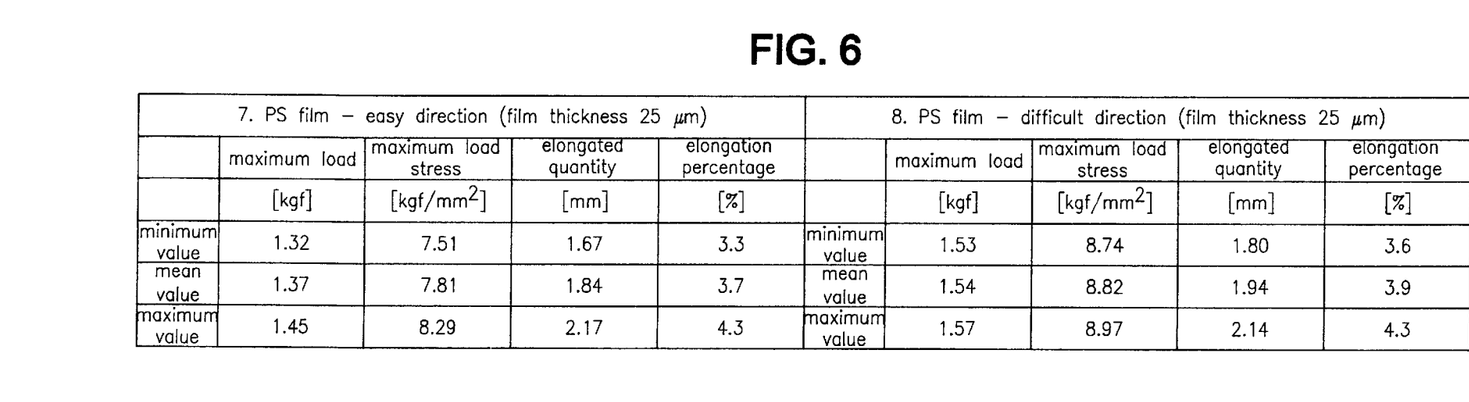
FIG. 6 is a comparison table of maximum loads, maximum load stresses, elongated quantities, and elongation percentages in easily tearable and not-easily tearable directions in the case of the syndiotactic polystyrene film (25 $\mu$m) used as the connecting means.
Figure 7:
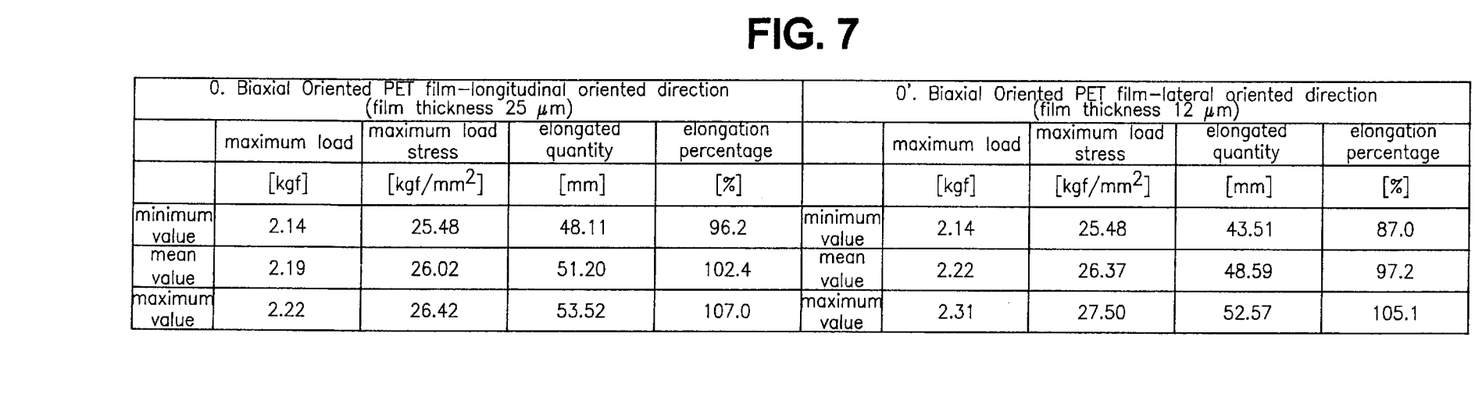
FIG. 7 is a comparison table of maximum loads, maximum load stresses, elongated quantities, and elongation percentages in longitudinal and lateral directions in the case of a biaxial oriented polyethylene terephthalate film 12 $\mu$m).
Figure 8:
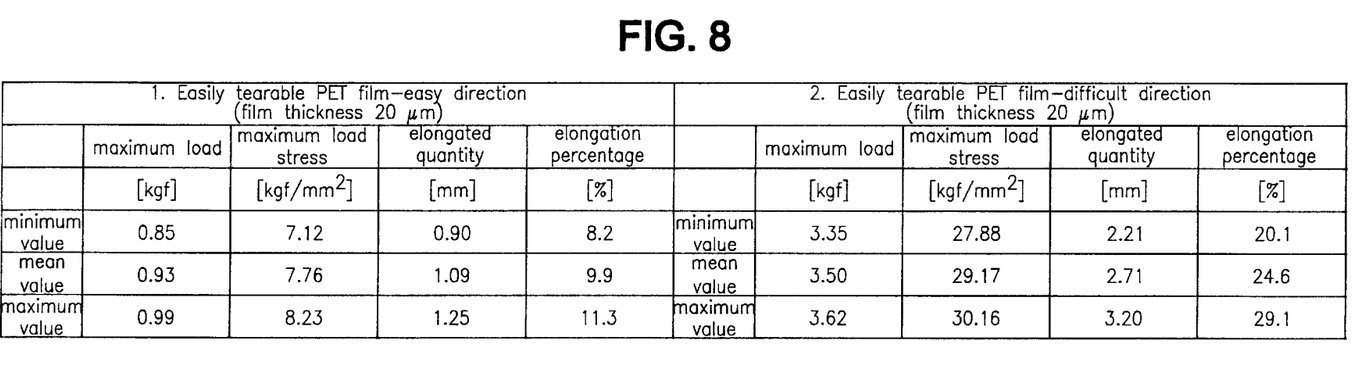
FIG. 8 is a comparison table of maximum loads, maximum load stresses, elongated quantities, and elongation percentages in easily tearable and not-easily tearable directions in the case of an easily tearable polyethylene terephthalate film (20 $\mu$m).
Figure 9:
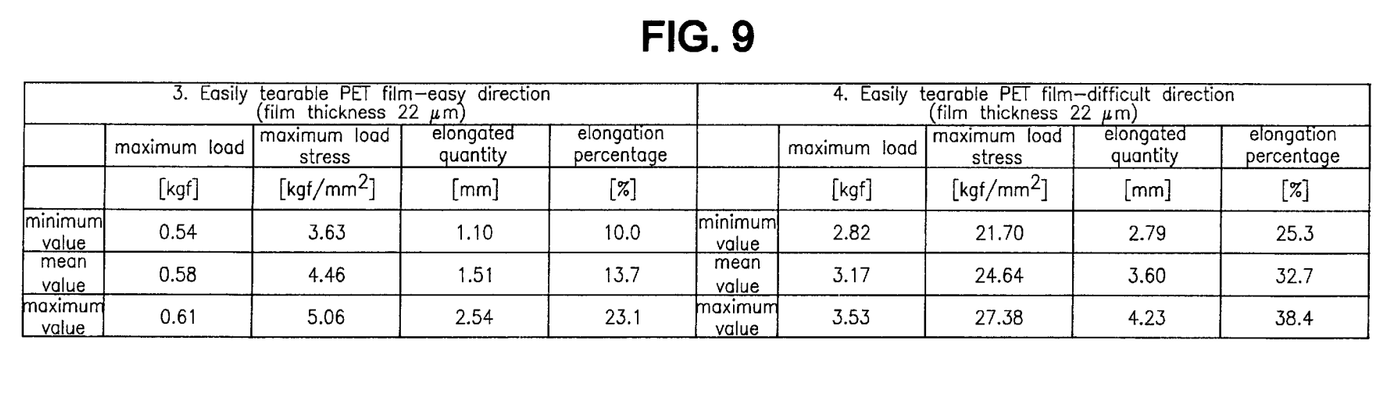
FIG. 9 is a comparison table of maximum loads, maximum load stresses, elongated quantities, and elongation percentages in easily tearable and not-easily tearable directions in the case of an easily tearable polyethylene film (22 $\mu$m).
Figure 10:
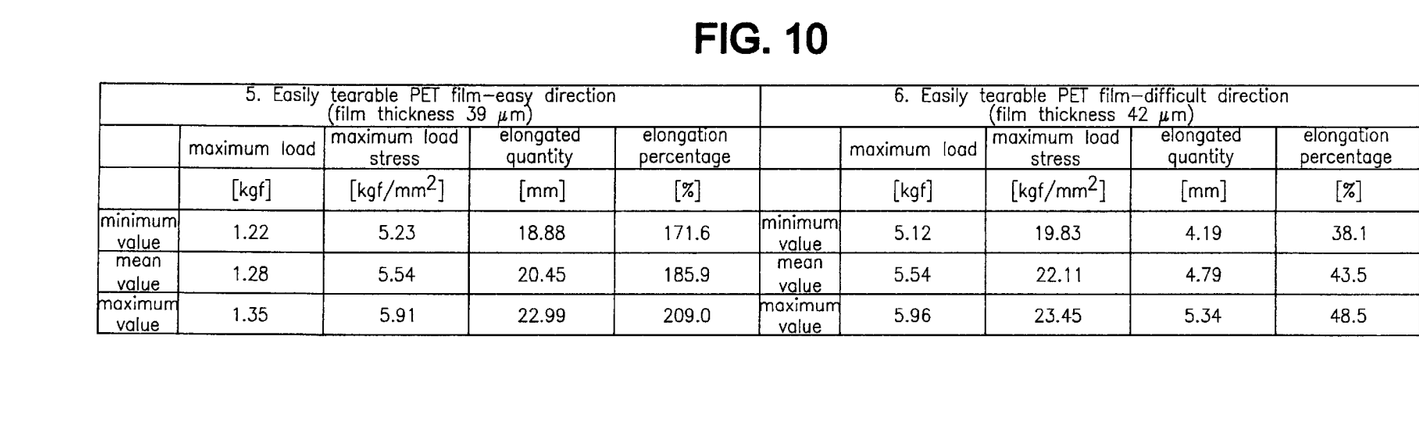
FIG. 10 is a comparison table of maximum loads, maximum load stresses, elongated quantities, and elongation percentages in easily tearable and not-easily tearable directions in the case of an easily tearable polypropylene film (39 $\mu$m).

FIG. 6 shows a test result of characteristics of the syndiotactic polystyrene. A film of a thickness of 25 μm (micron) has a direction in which the film is easy to tear (this direction will be referred to as "easy direction") and a direction in which the film is difficult to tear (this direction will be referred to as "difficult direction"). When comparing the mean values of the respective maximum loads, the difference between those in the easy and difficult directions is small as follows:

1.54 (difficult direction)−1.37 (easy direction)=0.17 [Kgf]

The difference between the mean values of the respective maximum load stresses is 8.82 (difficult direction)−7.81 (easy direction)=0.01 [Kgf/mm$^2$]

The difference between the mean values of the elongated quantities in the difficult and easy directions is 1.94 (difficult direction)−1.84 (easy direction)=0.1 [mm]

The difference between the mean values of the elongation percentages in the difficult and easy directions is 3.9 (difficult direction)−3.7 (easy direction)=0.2 [%]

Thus, the difference is small between the maximum loads, the maximum load stresses, the elongated quantities, and the elongation percentages in the difficult and easy directions.

In comparison with this, some materials, such as biaxial oriented polyethylene terephthalate (OPET), easily tearable polyethylene terephthalate (PET), easily tearable polyethylene (PE), and easily tearable polypropylene (PP), are relatively easy to tear. However, there is a great difference between the maximum loads in the easy and difficult directions, the maximum load stresses in the easy and difficult directions, the elongated quantities in the easy and difficult directions, or the elongation percentages in the easy and difficult directions.

FIGS. 7 to 10 show test-results of biaxial oriented polyethylene terephthalate (OPET), easily tearable polyethylene terephthalate (PET), easily tearable polyethylene (PE), and easily tearable polypropylene (PP), respectively.

According to the results of the test of tearing the plastic films as shown in FIGS. 6 to 10, in the syndiotactic polystyrene film (25 μm thick) according to the present embodiment, the mean value of the maximum load stresses varies from 7.81 (easy direction) to 8.82 (difficult direction) [Kgf/mm$^2$], and the mean value of the maximum loads varies from 1.37 (easy direction) to 1.54 (difficult direction) [Kgf]. The maximum load in the easy direction of the syndiotactic polystyrene film is smaller than the mean value (2.19 [Kgf]) of the maximum loads in the easy direction of the biaxial oriented polyethylene terephthalate, and is greater than the mean value (1.28 [Kgf]) of the maximum loads in the easy direction of the easily tearable polypropylene. However, the mean value (1.54 [Kgf]) of the maximum loads in the difficult direction of the syndiotactic polystyrene film is much smaller than the mean value of the maximum loads in the difficult direction of each of the other plastic films shown in FIGS. 7 to 10.

Additionally, the syndiotactic polystyrene film is 1.84 mm in the mean value of the elongated quantities in the easy direction, 1.94 mm in the mean value of the elongated quantities in the difficult direction, 3.7% in the mean value of the elongation percentages in the easy direction, and 3.9% in the mean value of the elongation percentages in the difficult direction. Thus, the mean value of the elongation percentages of the syndiotactic polystyrene film is the smallest of all the plastic films mentioned above.

Thus, the difference between the mean values of the maximum loads in the easy and difficult directions of the syndiotactic polystyrene film is the smallest in comparison with those of the other plastic films shown in FIGS. 7 to 10. The difference between the mean values of the elongated quantities and the difference between the mean values of the elongation percentages are also the smallest. This means that when the syndiotactic polystyrene film is used as a connecting means for a sheet of fastening means arranged in a row, the pushing force which the pushing plate requires is small, and the quantity of protrusion of film when cut off is lessened very much. For example, in the case of a staple 0.5 mm thick or so, the quantity of protrusion of film is almost indiscernible with the naked eye and, because the elongated quantity of the film is small, there is no fear that parts of the film which have not been cut off will be grown like mustaches.

As mentioned above, according to the present invention, since a film (a connecting means) made of syndiotactic polystyrene is easily tearable when receiving a tensile load, the film is cut off in a direction of the force applied by a pushing plate when a staple of a sheet of staples is separated from the other staples. Therefore, both the cut surfaces of the film stuck on the staple present a very sharp-cut appearance, and the outward appearance of the staple is much improved. Additionally, since the syndiotactic polystyrene film is easily tearable, the pushing plate does not need to apply great force to the sheet of staples on which the film is stuck. Instead of the staples, plate-like clips may be used. A direction in which the film is torn is taken to be perpendicular to a direction in which the clips are arranged. Therefore, a separating means for separating fastening means does not require excessive separating force or excessive separating acceleration, and thus a problem of making a separating mechanism or a driving source of the separating means large-sized can be solved.

The present invention is also applicable to pin-like straight staples or U-shaped staples which are used in an electric or manual stapler. If this electric stapler or clip machine is set in a tray or sorter of a copying machine or a tray of a FAX machine, a problem of increasing consumption of electric power or a problem of increasing space requirements can be solved.

In this embodiment, connected straight staples which have been rolled are described as fastening means. However, a flat sheet of staples not to be rolled or U-shaped staples can be involved in the present invention, of course.

Additionally, in the fastening means, clips of a clip machine are involved which are used to fasten layers of, for example, paper together by bending and bringing plate-like pieces made of, for example, metal into contact with the edges of the layers. In this case, slender stainless steel plates each shaped rectangular may be arranged in a row in a width direction of the steel plate and be connected by, for example, a film and be rolled. Alternatively, those steel plates may be arranged to be a sheet of steel plates so as to be put upon another sheet of steel plates. A stapler to be loaded with the aforementioned staples or a clip machine to be loaded with the aforementioned clips may be used as an individual device, or may be attached to a machine in which plenty of sheets of paper are used, such as a copying machine, a FAX machine, or an office printer.

What is claimed is:

1. A belt including a plurality of fastening means, each having a shape of a needle or a plate, for fastening thin materials, and connecting means for separably connecting said plurality of fastening means together so that said plurality of fastening means are contiguously arranged in a row, wherein said connecting means is composed of a plastic film oriented in a transverse direction of said plastic film to have a resistance to a tensile load in a longitudinal direction of the plastic film less than that in the transverse direction.

2. The belt according to claim 1, wherein said fastening means are staples.

3. The belt according to claim 1, wherein said plastic film is used together with fine fibers extending in the direction in which said fastening means are arranged.

4. The belt according to claim 1, wherein said fastening means are needlelike staples or platelike clips, and said plastic film has a property of being easily torn off by a tensile load.

5. The belt according to claim 1, wherein said plastic film is glued to a middle portion of said fastening means excluding at least any leg portion thereof.

* * * * *